(12) United States Patent
Moreira-Matias et al.

(10) Patent No.: US 10,395,183 B2
(45) Date of Patent: Aug. 27, 2019

(54) REAL-TIME FILTERING OF DIGITAL DATA SOURCES FOR TRAFFIC CONTROL CENTERS

(71) Applicant: NEC EUROPE LTD., Heidelberg (DE)

(72) Inventors: Luis Moreira-Matias, Heidelberg (DE); Vitor Cerqueira, Ponte de Lima (PT)

(73) Assignee: NEC CORPORATION, Tokyo (JP)

( * ) Notice: Subject to any disclaimer, the term of this patent is extended or adjusted under 35 U.S.C. 154(b) by 722 days.

(21) Appl. No.: 15/070,119

(22) Filed: Mar. 15, 2016

(65) Prior Publication Data

US 2017/0270413 A1 Sep. 21, 2017

(51) Int. Cl.
*G06N 20/00* (2019.01)
*G01C 21/00* (2006.01)
*G06N 5/00* (2006.01)
*G08G 1/01* (2006.01)
*G08G 1/017* (2006.01)

(52) U.S. Cl.
CPC ............. *G06N 20/00* (2019.01); *G01C 21/00* (2013.01); *G06N 5/003* (2013.01); *G08G 1/0116* (2013.01); *G08G 1/0129* (2013.01); *G08G 1/0141* (2013.01); *G08G 1/0175* (2013.01)

(58) Field of Classification Search
CPC ......... G06N 99/05; G06N 5/003; G01C 21/00
See application file for complete search history.

(56) References Cited

U.S. PATENT DOCUMENTS 9,183,744 B2 11/2015 Smyth
2007/0208494 A1* 9/2007 Chapman ............. G08G 1/0104
    701/117
2013/0253808 A1 9/2013 He et al.
(Continued)

FOREIGN PATENT DOCUMENTS

CN 102682345 A 9/2012
CN 102693633 B 9/2012
CN 103745602 A 4/2014
(Continued)

OTHER PUBLICATIONS

Hervé Abdi, et al., "Multiple factor analysis: principal component analysis for multitable and multiblock data sets", Wiley Interdisciplinary Reviews: Computational Statistics, vol. 5, Issue 2, pp. 149-179, Mar. 2013.
(Continued)

*Primary Examiner* — Vincent Gonzales
*Assistant Examiner* — Seth Andrew Raker
(74) *Attorney, Agent, or Firm* — Leydig, Voit & Mayer, Ltd.

(57) ABSTRACT

A system for filtering data for a traffic control center includes: a plurality of data sources, comprising a plurality of traffic-related data sources and a weather-related data source; one or more network computing devices, configured to process data from the plurality of data sources to predict causes associated with predicted traffic incidents, and to select data from the plurality of data sources to be output to the traffic control center based on the predicted causes; and one or more output devices, located at the traffic control center, configured to display respective data selected by the one or more network computing devices.

10 Claims, 7 Drawing Sheets

(56) References Cited

U.S. PATENT DOCUMENTS

2015/0221218 A1* 8/2015 Downs ............... G08G 1/0129
701/119

FOREIGN PATENT DOCUMENTS

| CN | 103903452 A | 7/2014 |
|---|---|---|
| EP | 2023308 A1 | 2/2009 |
| WO | WO 0169569 A2 | 9/2001 |

OTHER PUBLICATIONS

Redaccion Atraccion 360, "Caos vial frena competitividad en el df", Electronic, May 2013, pp. 1-7, URL: http://www.atraccion360.com/caos-vial-frena-competitividad.en-el-df.

Asim Karim, et al., "Incident Detection Algorithm using Wavelet Energy Representation of Traffic Patterns", Journal of Transportation Engineering, pp. 232-242, May/Jun. 2012.

Igor Kononenko, et al., "Overcoming the myopia of inductive learning algorithms with RELIEFF", Applied Intelligence, vol. 7, issue 1, pp. 39-55, Jan. 1997.

Marco Lippi, et al., "Short-Term Traffic Flow Forecasting: An Experimental Comparison of Time-Series Analysis and Supervised Learning", IEEE Transactions on Intelligent Transportation Systems, vol. 14, issue 2, pp. 871-882, Mar. 19, 2013.

Luis Moreira-Matias, "Drift3Flow: Freeway-Incident Prediction using Real-Time Learning", 2015 IEEE 18$^{th}$ International Conference on Intelligent Transportation Systems, pp. 566-571, Sep. 15-18, 2015.

NHTSA—National Highway Traffic Safety Administration, "Traffic Safety Facts 2012", U.S. Department of Transportation, Tech. Rep., Dec. 2012, pp. 1-248, URL: http://www.nrd.nhtsa.dot.gov/Pubs/812032.pdf.

Steven L. Salzberg, "Book Review: C4.5: Programs for Machine Learning by J. Ross Quinlan. Morgan Kaufmann Publishers, Inc., 1993", Machine Learning, vol. 16, pp. 235-240, Dec. 1994.

Robert E. Schapire, "The Strength of Weak Learnability", Machine Learning, vol. 5, No. 2, pp. 197-227, Oct. 1989.

S. Tang, et al., "Traffic-Incident Detection—Algorithm Based on Nonparametric Regression", IEEE Transactions on Intelligent Transportation Systems, vol. 6, No. 1, pp. 38-42, Mar. 2005.

Billy M. Williams, et al., "Modeling and Forecasting Vehicular Traffic Flow as a Seasonal ARIMA Process: Theoretical Basis and Empirical Results", Journal of Transportation Engineering, vol. 129, No. 6, pp. 664-672, Nov./Dec. 2003.

* cited by examiner

REAL-TIME FILTERING OF DIGITAL DATA SOURCES FOR TRAFFIC CONTROL CENTERS

BACKGROUND

Road traffic congestion is a phenomenon that happens due to some sort of limitation on the normal flow of traffic. It is possible to divide congestion causes into two general groups: (1) recurrent overdemand, which happens on a regular basis (e.g. morning peaks due to commuters), and (2) sudden reduced capacity events, which include car accidents/breakdowns, infrastructural problems (e.g. road collapse, fire) or difficult weather conditions (e.g. fog, heavy rain/snows).

These two types of events are referred to as "incidents." Incidents may result in losses of different kinds, including, for example, productivity losses due to commuter delays, as well as other losses such as injuries or deaths due to accidents or due to delays in responding to accidents.

SUMMARY

In an exemplary embodiment, the invention provides a system for filtering data for a traffic control center. The system includes: a plurality of data sources, comprising a plurality of traffic-related data sources and a weather-related data source; one or more network computing devices, configured to process data from the plurality of data sources to predict causes associated with predicted traffic incidents, and to select data from the plurality of data sources to be output to the traffic control center based on the predicted causes; and one or more output devices, located at the traffic control center, configured to display respective data selected by the one or more network computing devices.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Modern road traffic network centers possess advanced equipment which allows them to receive digital traces of information in real-time from a road network covering a large and wide area. This information covers a heterogeneous set of possible sources, ranging from human inputs (e.g., manually logged incidents), loop counters, weather data and video camera footage, among others. However, even if such sensor networks theoretically allow ubiquitous monitoring of the traffic network, there is a limitation on the human resources that can be allocated to perform such monitoring (i.e., it would not be practical to assign a permanent employee to monitor each sensor/video camera).

The selection of the locations to be monitored closely in each moment may occur, for example, in two manners: (1) reactively (e.g., a location is monitored when an incident is flagged as occurring in that location); or (2) proactively (e.g., a location is monitored when an incident may occur in the near future).

An experienced traffic controller may rely on his or her own past experience with a given road network to attempt to monitor certain locations proactively (particularly where there have been consistent patterns of incidents in the past). However, not every traffic control center may have an experienced traffic controller that is able to accurately predict the locations at which incidents will occur, and even where such traffic controllers exist, it may not be practical to provide them with an on-demand capability to access data from all data sources within the network due to constraints on bandwidth and network usage.

Exemplary embodiments of the invention utilize information from the many data sources available in a road network (e.g., from a large amount of road sensors), and apply data analytics techniques (such as time series analysis, regression and classification methods) to predict the occurrence and nature of traffic congestion on a short-term horizon. By making relatively accurate predictions as to the nature (e.g., long or short period of congestion) and the cause thereof (e.g., due to overdemand or due to reduced capacity) and triggering spatiotemporal alarms to direct a traffic controller's attention to an incident early on (or before the incident even occurs), mobility levels on road networks may be improved by allowing the traffic controller to perform remedial actions early on (e.g., dispatching medical or other emergency personnel, or by adjusting variable message signs in an intelligent transportation system for deploying real-time traffic re-routing, reversible lanes, or dynamic speed limits). Alerting traffic controllers to particular information relating to incident prediction may include an automatic selection of data from a subset of a plurality of data sources for broadcasting through a network to output devices viewed by the traffic controllers.

Thus, these exemplary embodiments allow for a reduction in response time required to overcome incidents or to mitigate the severity of an incident by facilitating earlier deployment of corrective and/or preventive measures. Additionally, because of the automatic selection of data from the subset of the plurality of data sources, the strain on network bandwidth of providing traffic-related information is reduced, as only the sensors or data sources identified as being associated with a traffic incident (or a predicted likely traffic incident) are used to transmit the traffic-related information.

Exemplary embodiments of the invention are thus able to select an optimal subset of digital data sources (e.g., from various sources of video surveillance footage) to be provided to traffic monitoring centers based on a forecasted incident on a short time horizon for a given road network, and are thus able to reduce network usage by only bringing the most relevant information (i.e., from the selected subset of digital data sources) to the attention of human traffic controllers at the traffic monitoring centers.

These exemplary embodiments may provide a filter which selects only sensors which are useful for broadcasting data to real-time displays for a given situation, and the filter may utilize multiple criteria for the selection, including, for example, input loop counter data, incident event logs and weather reports (both historical and forecast data).

In an exemplary embodiment, the filtering process includes the following steps:
(1) preprocessing input data into a set of descriptive variables and a target variable corresponding to an incident cause (e.g., overdemand or reduced capacity);
(2) training an automatic classification system based on a large amount of historical data, which is able to generalize traffic congestion behavior for future and yet unknown occurrences;
(3) utilizing an Automatic Incident Detection framework to predict future congestion occurrences on short-term horizons in an automatic and continuous manner, and then predicting a congestion cause associated with each predicted future congestion occurrence;
(4) assigning a probabilistic incident score to each location; and
(5) ranking each location using the probabilistic incident score, with the rankings being updated each time any of the predictions change.
Each location has a set of sensors associated with the location, and signals to be blocked or broadcasted (e.g., video camera footage) for a traffic control room are selected based on the rankings (and may be further based on a user-defined parameter (N) indicating a number of available digital displays in the control room).

Figure 1:
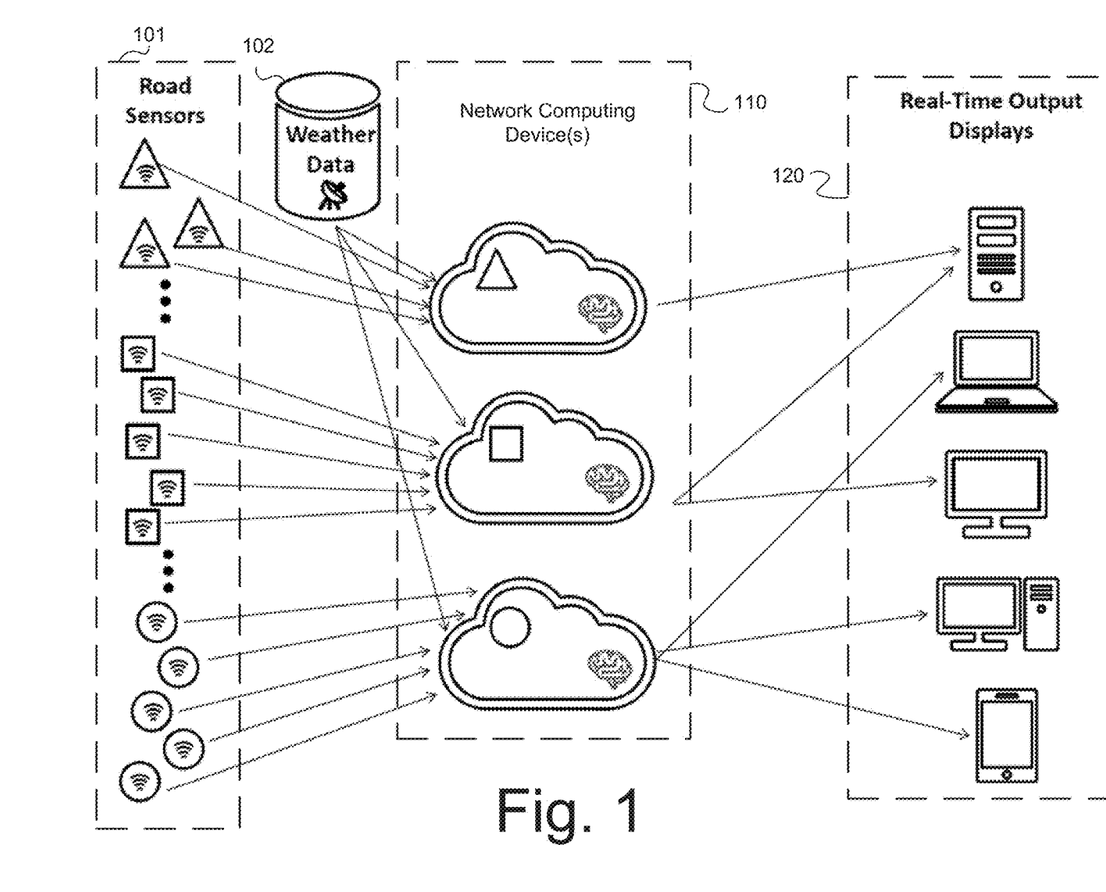
FIG. 1 illustrates an exemplary environment in which an exemplary embodiment of the invention filters data provided by a plurality of data sources and broadcasts the data to display devices at one or more traffic centers.

FIG. 1 illustrates an exemplary environment in which an exemplary embodiment of the invention filters data provided by a plurality of data sources and broadcasts the data to display devices at one or more traffic centers. Data sources include, for example, a plurality of different types of sensors 101 (such as video cameras, induction loop counters, plate recognition devices using Bluetooth or RFID, etc.) and a weather data source 102. This data is communicated via a network to one or more network computing devices 110 configured for data analytics and signal filtering (e.g., one or more servers in communication with the data sources). After the filtering, only a selected subset of data from the data sources is broadcasted to the end user computing devices 120 located in one or more traffic control centers for presentation to human traffic controllers (e.g., via one or more real-time output displays of personal computers, zero-client terminals, laptops, tablets, smartphones, etc.).

The environment depicted in FIG. 1 allows for a drastic reduction in the amount of signals that are broadcasted to the end user computing devices 120 based on the filtering provided by the one or more network computing devices 110, which provides for a reduction in network usage. In order to decide which data from the data sources is going to be broadcasted (or blocked) at digital displays in a traffic control center, a multi-step framework is used by the one or more network computing devices 110 for deciding which data sources are relevant and should be displayed at any given moment. The multi-step framework is based on a decision model that is automatically built from the historical data provided by those data sources 101, along with corresponding weather data 102.

It will be appreciated that the environment depicted in FIG. 1 is merely an example, and that other computing environments may be utilized with respect to various embodiments and implementations of the principles discussed herein. It will further be appreciated that the components depicted in FIG. 1 may include one or more processors in communication with one or more non-transitory computer-readable mediums (e.g., RAM, ROM, PROM, volatile, nonvolatile, or other electronic memory mechanism) with processor-executable instructions stored thereon for carrying out the various operations described herein.

Figure 2:
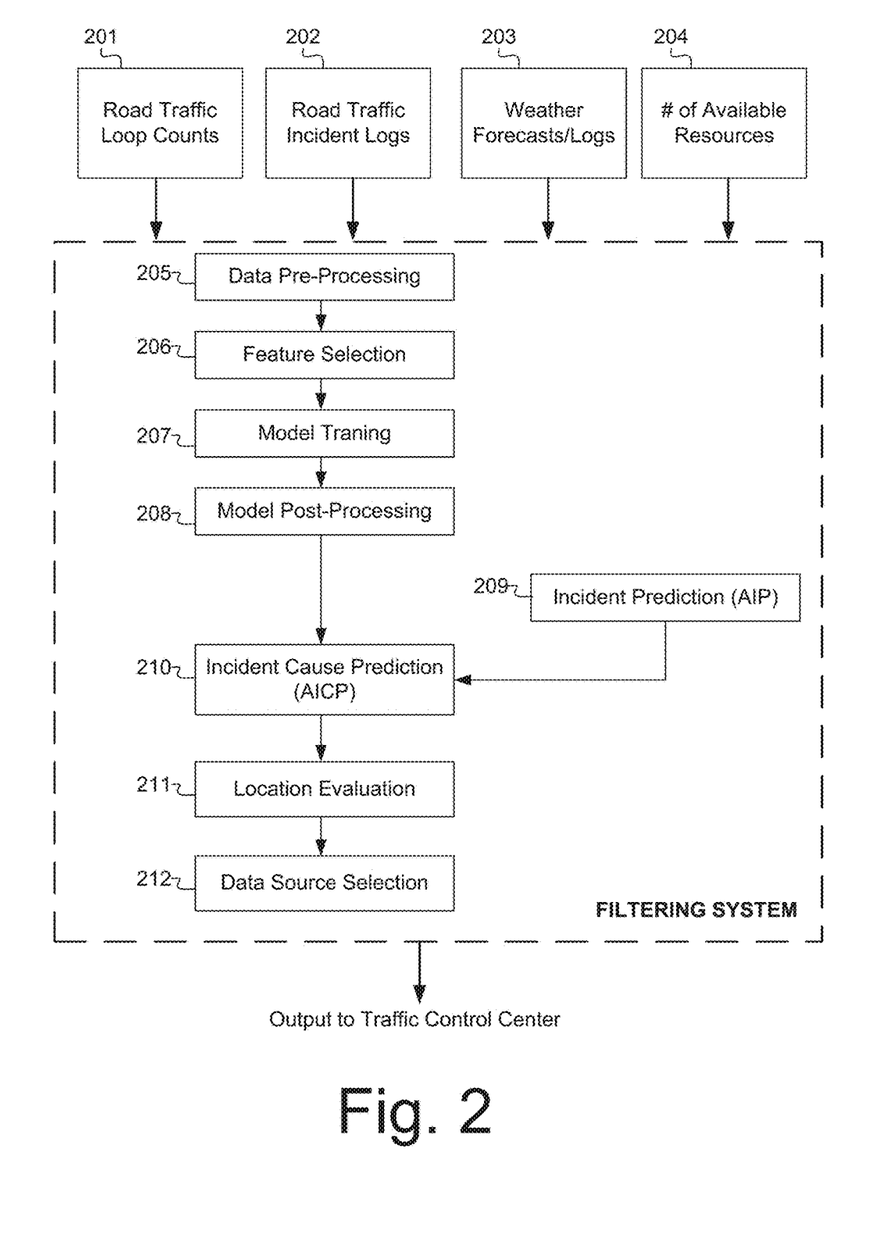
FIG. 2 is a flowchart illustrating an exemplary filtering process in an exemplary embodiment.

FIG. 2 is a flowchart illustrating an exemplary filtering process in an exemplary embodiment. As depicted in FIG. 2, exemplary inputs into the one or more network computing devices of the filtering system include, but are not limited to:
road traffic loop counts 201 (i.e., input data regarding both historical and real-time data including integer counts of a number of vehicle traversing a particular lane section during a fixed time interval (e.g., 1 minute));
road traffic incident logs 202 (i.e., input data regarding recorded historical road incidents including location, severity, time, duration and cause);
weather forecasts and logs 203 (i.e., input data from weather stations proximate to the road locations corresponding to the road traffic loop counts 201 and road traffic incident logs 202, which may include a series of weather data having a certain periodicity (e.g., hourly)); and
a number of available resources 204 (i.e., a parameter that indicates a number of available digital displays (e.g., monitors) at a given traffic control center).

The filtering system processes this input data, which may include various input signals broadcasted from different types of data source sensors (e.g., plate recognition by RFID or Bluetooth, video footage, road loop counters, etc.), and selects only certain data out of the input data to be broadcasted to a traffic control center. The number of signals (M) that are input from the data sources to the one or more network computing devices of the filtering system is much less than the number of signals (O) that are output from the filtering system to the end user computing devices in traffic control centers (O<<M).

In an exemplary embodiment, the filtering system processes the input data by ranking every monitored road location using a probabilistic score (i.e., future incident rate), which is computed using incident prediction for the location, the time, and the nature of a soon-to-be road congestion event. To do so, the filtering system utilizes an Automatic Incident Prediction (AIP) framework for a short-term horizon, as well as an Automatic Incident Cause Prediction (AICP) framework.

It will be appreciated that there are multiple existing AIP techniques that may be used, including, for example, those described in A. Karim and H. Adeli, "Incident detection algorithm using wavelet energy representation of traffic patterns," Journal of Transportation Engineering, vol. 128, no. 3, pp. 232-242 (2002); M. Lippi, M. Bertini, and P. Frasconi, "Short-term traffic flow forecasting: An experimental comparison of time-series analysis and supervised learning," IEEE Transactions on Intelligent Transportation Systems, vol. 14, no. 2, pp. 871-882 (2013); S. Tang and H. Gao, "Traffic-incident detection-algorithm based on nonparametric regression," IEEE Transactions on Intelligent Transportation Systems, vol. 6, no. 1, pp. 38-42 (2005); and B. Williams and L. Hoel, "Modeling and forecasting vehicular traffic flow as a seasonal arima process: Theoretical basis and empirical results," Journal of Transportation Engineering, vol. 129, no. 6, pp. 664-672 (2003); which are all incorporated by reference herein.

To provide the AICP framework, exemplary embodiments of the invention build a congestion event classifier from input data. First, input data, such as road traffic loop counts 201, road traffic incident logs 202, and weather forecasts and logs 203, are transformed into a relational table where a series of explanatory features are organized in relation to a target value corresponding to a congestion cause. For example, the target value may be a binary value set where 0 corresponds to "OVERDEMAND" events and 1 corresponds to "REDUCED_CAPACITY" events. Next, features to be used for training the congestion event classifier are selected, and the congestion event classifier is trained using a decision tree-like induction model over such input data. The resulting decision tree is linearized into a set of rules which is pruned given its support (i.e., number/ratio of past evidence) in the training set. During traffic monitoring operations, this congestion event classifier is used, whenever a congestion alarm is triggered for a short-term time horizon by the AIP framework, to provide a prediction for the cause of the predicted congestion event.

In parallel, the actual cause associated with congestion events are logged into an event log and further fed into the system via the data inputs, and the model is re-trained with a certain periodicity to utilize this actual cause information to become more accurate.

The prediction of the congestion event provided by the AIP framework and the cause of that event provided by the AICP framework are then used to assign a probabilistic score or an incident rate to each location, which allows a sorted ranking of the locations. Finally, using the ranking and/or the assigned score/rate (and further based on the number of available resources for displaying information at a traffic control center), binary signals may be generated indicating which data sources (e.g. video camera footage) should be displayed and which should remain hidden. For example, each data source for which it is determined that the data should be displayed may be assigned to a respective available digital monitor at the traffic control center.

In an exemplary embodiment, the data driven machine learning framework provided as the AICP framework may be a "Classification of Traffic JAM Causes with Boosted Trees" (or "CJAMmer" framework developed by the inventors, which is a binary classifier that is robust with respect to unbalanced data and that is configured to classify traffic congestion (or "jam") events up to 24 hours in advance of the event regarding the two main causes of such events: (1) excessive demand or (2) suddenly reduced capacity. CJAMmer utilizes information regarding prior event occurrences, as well as weather data, in order to classify each congestion event predicted by an AIP framework. CJAMmer is built using a C4.5 decision tree learning algorithm (for example, as described in J. Quinlan, C4.5: programs for machine learning. Morgan Kaufmann (1993), which is incorporated herein by reference), which is enhanced by a Boosting ensemble schema (for example, as described in R. Schapire, "The strength of weak learnability," Machine Learning, vol. 5, no. 2, pp. 197-227 (1990), which is incorporated herein by reference).

CJAMmer Methodology

The CJAMmer framework is a supervised learning method for AICP that includes: (A) Feature Selection; (B1) Model Training using C4.5; (B2) Model Ensemble by Simple Boosting and (C) Post-Processing. Once these steps have been performed, the output model is ready to classify the causes of future traffic jam occurrences assuming that an accurate AIP framework is in place. Such AIP framework must be able to (D) predict future occurrences of traffic jams (i.e. a series of pairs (timestamp, location)) independently of the type of method employed. The causes of such future traffic incident occurrences can then be predicted using the model produced in (C) for the pairs output by (D). The CJAMmer steps (A-C) are as follows.

(A) Feature Selection

Let $E=e_1, \ldots, e_N$ be a set of N data records describing historical occurrences of incidents where each occurrence is described by a set of F features, which may be numerical and/or categorical. Let $W=\{w_1, \ldots, w_N\}$ be a set of weather conditions associated to such events' location/timestamp (e.g. temperature, air pressure), where each weather condition is also described by a set of Z features defined as $w_i \rightarrow R^Z$, $\forall w_i \in Z$. Finally, let $C=c_1, \ldots, c_N$ be a set of N labels regarding the causes of the events where $c_i \in \{0, 1\}$ and $X=E \rightarrow W \rightarrow C: |X|=N$ be the complete training set. The idea of this step is to reduce the initial feature set of size $S=F+Z$ to a smaller one (i.e., $S'<S$), which contains only features with true predictive power regarding the present task. Since the event samples are defined by data provided from two heterogeneous sources (E and W), an independent feature selection process was conducted to reduce the sample's dimensionality S by reducing F and Z separately.

In any supervised learning task, it is expected to find one relationship (i.e. dependence) between a set of explanatory variables (i.e. F and Z) and a target/dependent one (i.e. the congestion cause C). The existence of correlated features among the set of explanatory variables (known as independent) imply the existence of multiple dependences in the dataset, which may make the induction process difficult. Dimensionality reduction is a task often conducted before applying any induction algorithm. Its goal is to find the minimum set of features that can describe such desired set of independent explanatory variables. One technique for doing so is Principal Component Analysis, which uses an orthogonal transformation to convert a set of samples defined in a feature space where some of their components may be correlated into a smaller one of latent variables which are linearly uncorrelated. However, Principal Component Analysis can only be applied to numerical features. On the other hand, Multiple Correspondence Analysis can be applied for nominal data.

Exemplary embodiments of the invention, which use a set of mixed data, may employ Factor Analysis for Mixed Data (FAMD), e.g., as described in J. Pages, "Analyse factorielle de donn'ees mixtes," Revue de statistique appliqu'ee, vol. 52, no. 4, pp. 93-111 (2004), which is incorporated herein by reference. FAMD basically takes advantage of both Principal Component Analysis and Multiple Correspondence Analysis to project dimensions simultaneously based on the two types of variables. Explanatory variables in F which possess no/low correlations with all the produced latent variables should be excluded from the feature set. This process can be done by visual inspection or, alternatively, by setting a minimum threshold for the minimum correlation to be in place with those latent variables.

As $w_i \rightarrow R^Z$, $\forall wi \in Z$, misclassification error probability can be reduced by pruning the feature set to a smaller set of relevant features. This can be achieved by employing the RELIEFF algorithm (e.g., as described in I. Kononenko, E. Šimec, and M. Robnik-Sikonja, "Overcoming the myopia of inductive learning algorithms with relieff," Applied Intelligence, vol. 7, no. 1, pp. 39-55 (1997), which is incorporated herein by reference), which is a statistical inference method which assigns a probability to each feature and aims to describe its ability of changing the outcome of the target.

The resulting feature set S is used to model training based on the input training set.

(B) Model Training

The model training includes the following. First, a sliding window of H size (a user defined parameter) is used to use only the most recent samples X' from the original training set X, i.e. X'∪X. Second, a feature selection stage specifically for this dataset is conducted using winnowing (e.g., as described in N. Littlestone, "Learning quickly when irrelevant attributes abound: A new linear-threshold algorithm," Machine Learning, vol. 2, no. 4, pp. 285-318 (1988), which is incorporated herein by reference), which is a perceptron-based algorithm typically used to learn a linear classifier from labeled examples (and here used to select which attributes should be used or not). The relevancy of having this step is to avoid the over-fitting of particular cases on the training set due to the capture of irrelevant and/or correlated dependences among the initial feature set. Third, given such a feature subset, a decision tree is learned using the C4.5 algorithm. This procedure is briefly explained below, with more explanation provided with respect to categorical feature sets and pre-pruning/post-pruning processes in J. Quinlan, "C4.5: programs for machine learning," Morgan Kaufmann (1993), which is incorporated herein by reference.

A decision tree D is created by dividing recursively the samples within X using multiple splits, generating a series of logical subsets $\{D_1, D_2, \ldots\}$. Such splits follow a common split criterion and they stop when a given stop criterion is met. Both criteria are explained as follows. The split criterion used by default in C4.5 is the gain ratio. Let p(X, j) denote the proportion of cases in X that belong to the jth class. Let I(D) denote the residual uncertainty about the label of each sample $\in X$ while Gain(D, T) denotes the corresponding information gained by a test T with k outcomes. Both can be defined as follows.

$$I(D) = -\sum_{j=1}^{2} p(D, j) \times \log_2(p(D, j)) \tag{1}$$

$$Gain(D, T) = I(D) - \sum_{i=1}^{k} \frac{|D_i|}{|D|} \times I(D_i) \tag{2}$$

Consequently, the test T that maximizes the Gain(D, T) is the one chosen. This process repeats itself until the stop criterion is met. The latter is defined by the veracity of one out of three possible conditions, defined as follows. Let $D_i$ be our current partition to divide. $D_i$ is said to be undivisible and, consequently, form a leaf node if (i) all its samples are labeled with one single class or if (ii) $|D_i|<\theta$ where $\theta$ is a user-defined parameter or if (iii) Gain($D_i$,T)=0, $\forall$T.

Fourth, after the abovementioned induction procedure, a simple boosting method is triggered. This boosting method includes repeating the steps of creating the decision tree and choosing the test T that maximizes the Gain(D, T) are repeated $\tau$ times (where $\tau$ is a user-defined parameter). The weight of each sample varies from iteration to iteration depending on the observed error (which results in certain samples, such as a car crash event, being given greater weight than routine activity, such as congestion associated with a particular day or time). On each of the trials, the resulting tree D is evaluated against X (i.e., its original training set). Before the first trial, a weight set $L \rightarrow [0, 1]^N$ is assigned to each $x_i \in X$ and initialized as $l_i=1$, $\forall l_i \in L$. After each trial, the weights of the samples correctly evaluated $X_{pos}$ are updated as follows $l_i=l_i-E$, $\forall l_i \in X_{pos}$. Conversely, the weights of the incorrectly labeled samples are updated as $l_i=l_i+E$, $\forall l_i \in X_{pos}$. This procedure repeats itself by performing a slight change in eq. (2) to re-use this information on the training stage of the next trial. This equation is re-written as $$Gain(D, T) = I(D) - \frac{1}{\sum_{l \in L} l} \sum_{i=1}^{k} \sum_{j=1}^{|D_i|} l_j \times I(D_i), \tag{3}$$

By doing so, this boosting process gives more relevance to the incorrectly classified samples on the splitting criteria, which will create larger groups of samples of this type on higher levels of the tree instead of multiple small and deep leaves, thus increasing the model generalization and reducing the undesired over-fitting effect often associated with unbalanced datasets.

Fifth, this entire training procedure is repeated from scratch with a given periodicity P (a user-defined parameter). By doing so, the most recent labeled samples are re-included into the training set from time to time, on an industrial perspective of learning algorithm usage.

(C) Post-Processing

The trained/boosted tree still passes throughout a final step before being ready to be used on any test sample: the linearization of the decision tree to a rule set. This is done by combining the disjunction of all conjunctions contained in the decision nodes. As each distinct path through the tree produces a distinct rule, it makes it easier to prune rules which have low support (i.e. number of samples) in the training set. Moreover, unlike the trees, rule sets do not maintain a disjunction between attribute tests that occur near the tree root (e.g., as described in T. Mitchell, "Machine learning," McGraw Hill, 1997, vol. 45, which is incorporated herein by reference). Consequently, this step is another mechanism to avoid over-fitting by pruning non-generalizable rules. The minimum support $\alpha \in N$ to allow a rule to be embedded into the resulting predictive model is a user-defined parameter.

CJAMmer Example and Results

An exemplary implementation of the CJAMmer framework described above was performed with respect to a real world case study. This study was conducted using data collected through a traffic monitoring system of a major freeway deployed in an Asian country, connecting a capital city to a secondary one. This system both collects and broadcasts traffic-based measurements in real-time with distinct temporal granularities (depending on the type of sensors installed on each lane). Each sensor measures traffic flow, lane occupancy rate and instantaneous vehicle speed in one-minute intervals. This dataset used data collected from 211 sensors covering all the lanes existing on a given location, which includes both transit directions. Its total length is roughly 216 km while its sensors are typically deployed in groups along subsections, separated by 500 m spatial intervals. This data was collected through 3 consecutive months.

Traffic incidents are monitored on-site based on such sensors, as well on a large-scale video surveillance system. Then, event logs are manually produced reporting the characteristics of the incidents as well as their temporal evolution. Such logs were pre-processed into a learning dataset with the following input variables: (1) ID, (2) Day Number (consecutive numbers starting from 1 to the first existing day in the dataset) and (3) Weekday, (4) Starting Time and (5) Duration (both in seconds), (6) Direction, (7) Congestion Section Length and its (8) Starting Location in relative terms to the highway start (in meters). The dependent variable is the traffic cause, the values of which are described in Table I below.

TABLE I

| Label | Description | Comments |
|---|---|---|
| 1 | huge amount of traffic | Traffic jam caused by high demand; |
| 2 | road work | Long-term planned road work; |
| 3 | car accident | Car Accident; |
| 4 | fire | Fire on a vehicle or a structure; |
| 5 | blocked highway | Any type of event blocking the highway (partially of fully); |
| 6 | inattentive driving | E.g.: a fireworks display on the highway side, attracting drivers' attention; |
| 7 | car breakdown | A vehicle breakdown within a given lane; |
| 8 | weather | Rain, fog, light snow or hail; |
| 9 | regulation | Road closed to traffic re-routing; |
| 10 | disaster | E.g. Heavy Earthquake, Tsunami, Tornado; |
| 11 | road hazard | Collapse of an Highway structure; |
| 12 | snow removal | Road work to remove snow; |
| 13 | snowstorm | Heavy snow storm; |
| 14 | snow drifting | Snow blocks falling in the highway; |
| 70 | Emergency road work | An urgent intervention on the road due to any type of disaster; |
| 71 | accident restoration work | Similar to the previous one; |
| 99 | other reason | Other reasons not included in this table; |

During preprocessing, dependent variables (5) and (7) were removed due to their dependence on the remaining input variables, as well as (1). Additionally, six variables were generating containing the flow counts of the 15 minutes previous to the incident start time on both directions, aggregated by 5 minutes intervals.

The weather data was acquired through an open access repository (e.g., Weather Underground, "A weather api dedesign for developpers," Electronic (last access at October 2015), October 2015. [Online]. Available: http://www.wunderground.com/weather/api/). It provides both hourly as well as daily summaries regarding multiple weather features. They can be enumerated as follows: temperature, dew point, humidity, wind speed, wind gust speed, wind direction, wind temperature, visibility, pressure, heating index, precipitation index and condition description (e.g. overcast). Furthermore, six other booleans are included, covering the presence or absence of fog, rain, snow, hail, thunder and tornado. To determine the nearest weather station to query on each incident event, the latitude/longitude coordinates of its starting point needed to be estimated from the original location data. Finally, each one of those variables were considered as possible independent variables, forming a final set of 29 independent variables (six from flow counts data, five from event logs and eighteen on weather-related data).

Figure 3:
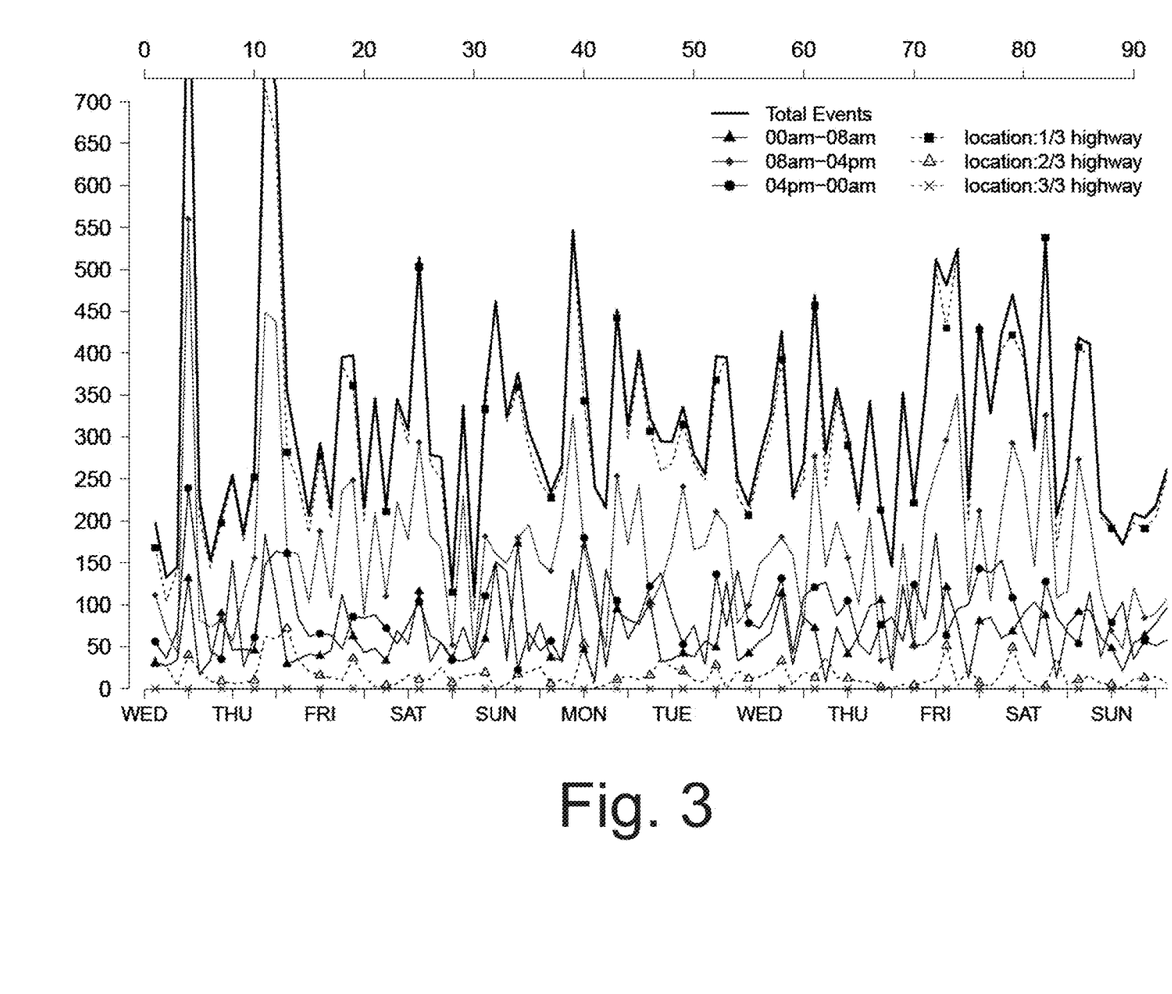
FIG. 3 is a plot that provides a descriptive analysis of a number of congestion events over time corresponding to different times (shown on the x-axis by number (upper caption) and by weekday (lower caption)) and highway locations.
Figure 4A:
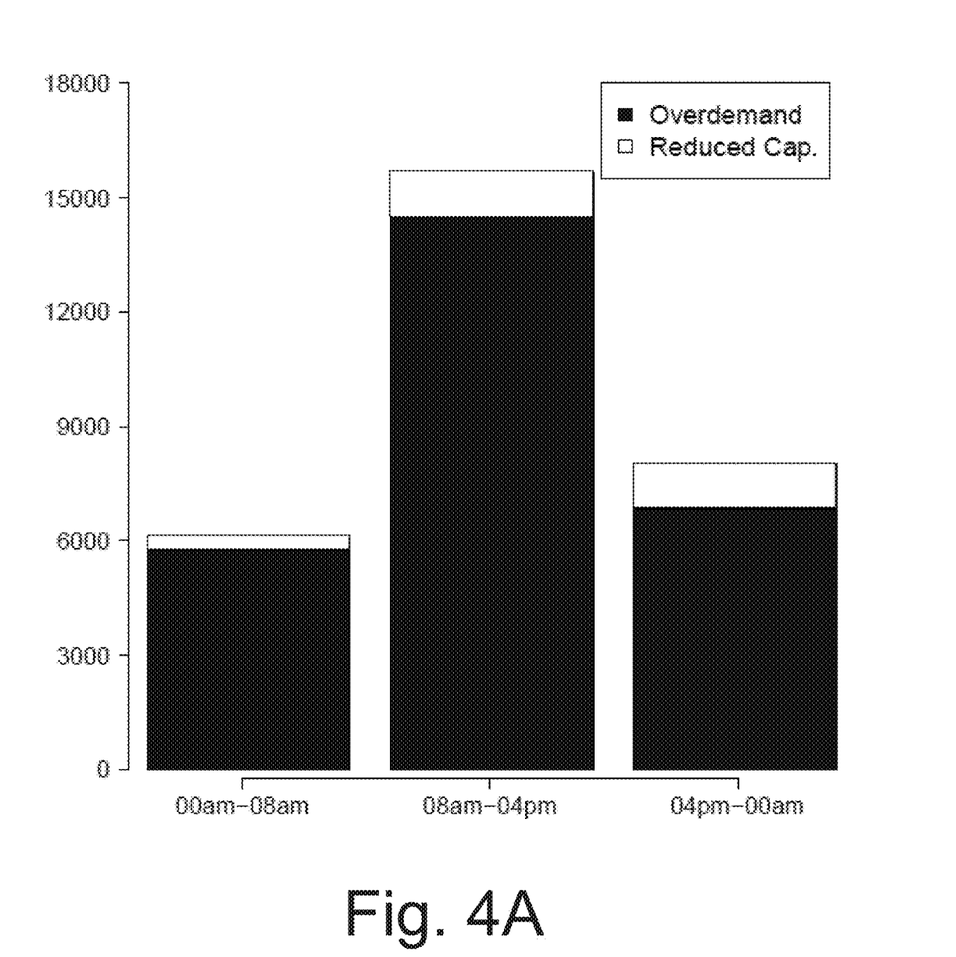
FIG. 4A illustrates ratios between overdemand/reduced capacity incidents corresponding to different times of day.

To turn the problem into a binary classification problem, a final preprocessing task was conducted by labeling the code 1 as overdemand events and the remaining ones as reduced capacity. FIG. 3 is a plot that provides a descriptive analysis of a number of congestion events over time corresponding to different times (shown on the x-axis by number (upper caption) and by weekday (lower caption)) and highway locations. FIG. 4A illustrates ratios between overdemand/reduced capacity incidents corresponding to different times of day. It is possible to see that most of the incidents happen on the 1st third of the road (around the capital city), as well during working hours (08 am-04 pm). However, besides an elevated number of congestion events happening on Sundays/Mondays, it is rather difficult to identify a clear time-dependency. The highly unbalanced ratio between overdemand and reduced capacity illustrated in FIG. 4A (i.e., 90%/10%) highlights even more how hard this classification problem may be.

In this exemplary implementation, a parameter setting as described in Table II below was employed.

TABLE II

| | Value | Description |
|---|---|---|
| $\varphi$ | 0.025 | minimum user-defined threshold to prune the weather feature set, given its influence on the target variable; |
| H | 60 days | sliding window to define training set size; |
| $\tau$ | 80 | number of boosting iterations, i.e. trials; |
| P | 1 day | periodicity used to re-train the classifier; |
| $\alpha$ | 2 | number of samples necessary to cover a pruned rule (in absolute terms), i.e. min cases; |

Figure 4B:
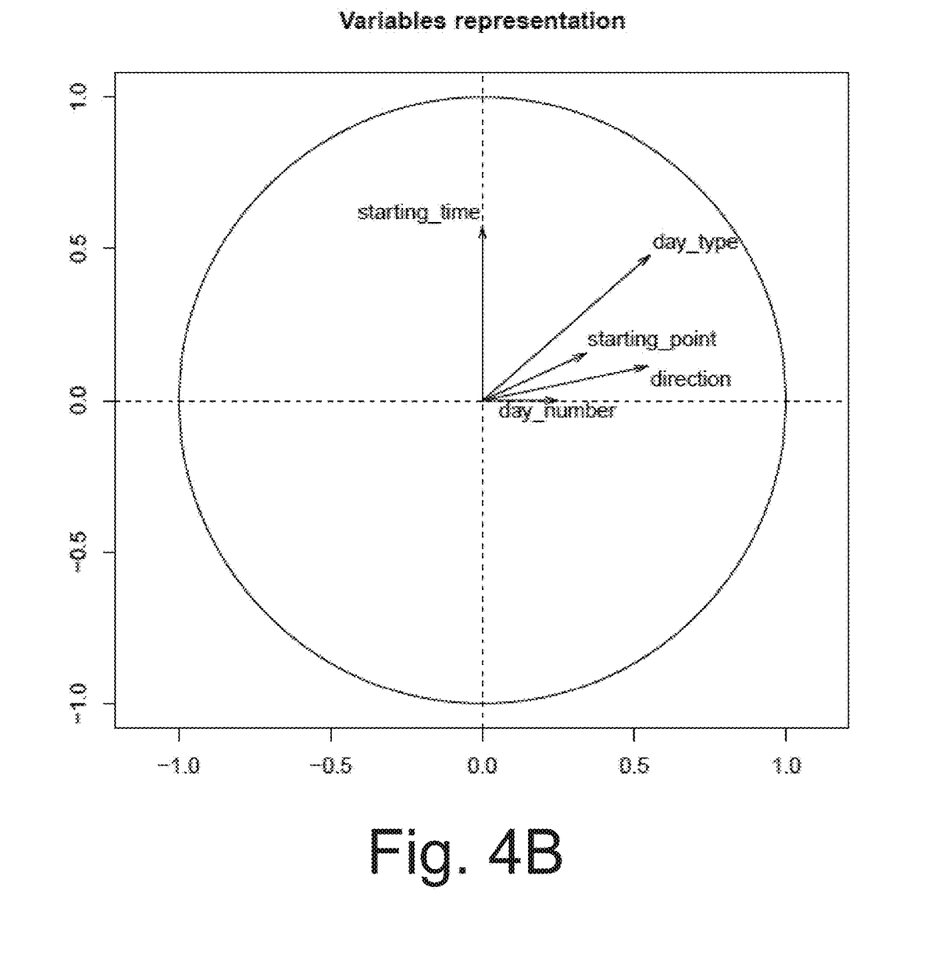
FIG. 4B illustrates Factor Analysis for Mixed Data (FAMD) results from event logs.

The first 60 days of the dataset were used as the training set, while the remaining ones were used as test set. The feature set was preprocessed in three stages: first, the event log data was preprocessed using FAMD. FIG. 4B illustrates the FAMD results from event logs. As a consequence of its low impact, the day number variable was pruned out. The flow variables were all considered. Yet, if there is no flow count prediction available for a given timestamp, the features are considered as having missing data. The weather variables were pruned using the RELIEFF algorithm. As result, only the pressure and two temperature variables were considered in the final feature set. An additional feature to set the weather conditions as GOOD/BAD was empirically defined using the remaining weather features.

The values of $\varphi$ and P were empirically defined, while the remaining ones were tested out of a pool of possible values using 10-fold cross validation over the initial 60-day training set. The pools for H, $\tau$ and $\alpha$ were defined as $\{30, 45, 60\}$, $\{1\} \cap \{(a_k)_{k=1}^8, a_k=10 \ k\}$ and $\{1, 2, 5\}$, respectively.

The implementation of R package [RWeka], i.e. J48 of C4.5 was used for the exemplary implementation. Additionally, the results provided by the exemplary implementation were compared to six other off-the-shelf classification frameworks: (1) Naive Bayes (NB), (2) Multilayer Perceptron (MLP), (3) Support Vector Machines (with a linear kernel) (SVM), (4) Logit Boost (LB), (5) Gradient Boosting (GB) and (6) Random Forests (RF). The implementations of all those algorithms were taken from R packages, namely, [RWeka] and [nnet] for first two and [caret] for the remaining ones, using their default attributes values. Finally, all these trials followed a similar setup to the exemplary implementation, leveraging the parameter P to re-train the model on a daily basis. Each method was then evaluated in terms of accuracy, precision and recall (for each one of the two possible label outputs), as described, for example, in Sections 5.7-5.8 of I. Witten and E. Frank, "Data Mining: Practical machine learning tools and techniques," Morgan Kaufmann (2005), which is incorporated herein by reference.

Table III below shows the obtained results using all the considered evaluation metrics, with ACC corresponding to prediction accuracy (percentage of accurate predictions out of total predictions made by the model), PREC_R corresponding to precision for reduced capacity events (percentage of correct predictions of reduced capacity events out of a total number of predicted reduced capacity events), REC_R corresponding to recall on reduced capacity events (percentage of correct predictions of reduced capacity events out of number of actual reduced capacity events), PREC_O corresponding to precision for overdemand events (percentage of correct predictions of overdemand events out of a total number of predicted overdemand events), and REC_O for recall on overdemand events (percentage of correct predictions of overdemand events out of number of actual overdemand events).

TABLE III

| Method | ACC | PREC_R | REC_R | PREC_O | REC_O |
| --- | --- | --- | --- | --- | --- |
| CJAMmer | 95.22% | 83.69% | 59.18% | 96.02% | 98.84% |
| MLP | 49.50% | 9.81% | 55.37% | 91.61% | 48.91% |
| SVM | 88.04% | 8.78% | 3.32% | 90.86% | 96.54% |
| NB | 89.61% | 12.09% | 2.21% | 90.93% | 98.39% |
| LB | 89.95% | 9.60% | 1.20% | 90.88% | 98.86% |
| GB | 90.29% | 5.56% | 4.01% | 90.85% | 99.31% |
| RF | 87.11% | 7.98% | 3.91% | 90.83% | 95.47% |

Figure 5:
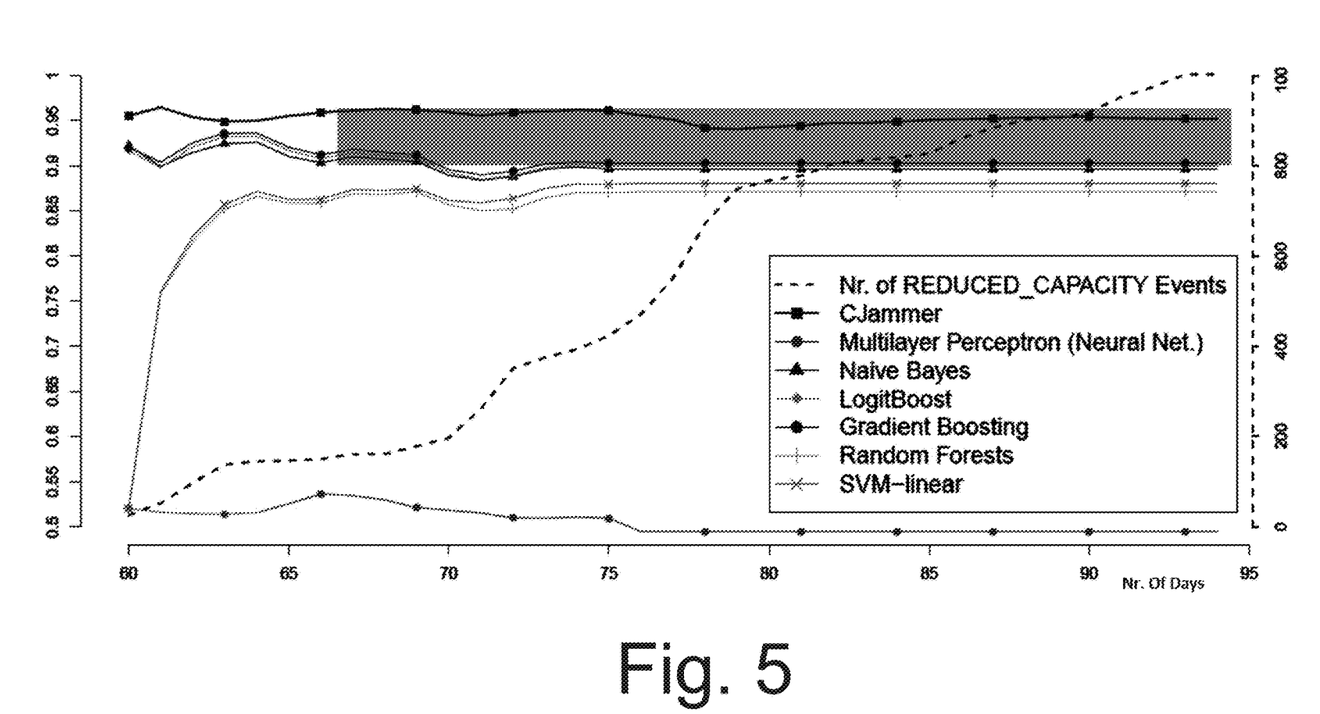
FIG. 5 is a plot illustrating the evolution of the accuracy of each of a plurality of tested methods over time alongside a total number of reduced capacity events.

FIG. 5 is a plot illustrating the evolution of the accuracy of each of the tested methods over time alongside the total number of reduced capacity events. The effectiveness is CJAMmer is shown in FIG. 5, especially with respect to the shaded portion of the plot.

Table III illustrates a clear supremacy of CJAMmer compared with conventional supervised learning methods for classification, which generally over-fit the majority class. The numbers on the recall of the minority class are illustrative of CJAMmer's effectiveness on defining an adequate decision boundary within the existing feature space. The winnowing may also have a particular effect on this (even if other decision tree-based methods such as RF do not output satisfactory results).

Turning back to FIG. 2, an exemplary embodiment of using a CJAMmer classifier within the context of the filtering system used for selecting data sources is depicted.

At stage 205, the input data is preprocessed by transforming the dataset on a relational table with multiple independent variables (e.g., direction, location, timestamp, humidity, flow count for the last 5 minutes, etc.) and one dependent/target variable for the CJAMmer model regarding the congestion cause. The target variable may assume one of two possible labels: overdemand or reduced capacity.

At stage 206, feature selection is performed by selecting apriori which features should be part of the training process for the CJAMmer model and which should be discarded. The feature selection may be performed by applying a Factor Analysis for Mixed Data (FAMD) (e.g., as described in J. Pages, "Analyse factorielle de donn'ees mixtes," Revue de statistique appliqu'ee, vol. 52, no. 4, pp. 93-111 (2004), which is incorporated herein by reference) over the event logs and a RELIEFF algorithm (e.g., as described in I. Kononenko, E. Simec, and M. Robnik-Sikonja, "Overcoming the myopia of inductive learning algorithms with relieff," Applied Intelligence, vol. 7, no. 1, pp. 39-55 (1997), which is incorporated herein by reference) for the weather data. For both, the features are pruned based on user-defined parameters which set the amount of entropy reduction that each feature may bring on estimating the value of the target variable. This step may be done initially just once, or may be done with a very low periodicity (e.g., once in six months).

At stage 207, the CJAMmer model is trained using a training set. Although a large amount of data may be available for training, the training set may be limited to use of just the most recent samples. The amount of recent data to use (i.e., a sliding window size) is based on a user-defined parameter. Then, the model training occurs on multiple trials. In each trial, a decision tree is generated using the selected features from stage 206. For example, the C4.5 algorithm (e.g., as described in J. Quinlan, C4.5: programs for machine learning. Morgan Kaufmann (1993), which is incorporated herein by reference) may be used for generating the decision tree. Then, the resulting model for the classifier is tested against the training data and the error of each sample is measured. This error is then used to change the relevance of each sample, with the relevance of samples which were misclassified as being increased and vice-versa. Then, the training of the next trial will take such weights into account. The number of trials is a parameter set by 10-fold cross validation. This trial-training stage is known as Boosting (e.g., as described in R. Schapire, "The strength of weak learnability," Machine Learning, vol. 5, no. 2, pp. 197-227 (1990), which is incorporated by reference herein). The model may be retrained with a certain periodicity defined by the user (e.g. 24 hours).

Further, after a prediction has been made as to the predicted cause of a predicted congestion event, the information regarding the prediction may be used together with actual information corresponding to the time and location of the predicted congestion event to re-train the model at stage 207.

At stage 208, the CJAMmer model is post-processed by linearizing the decision tree (which is generated based on stage 207) into a rule set. Each rule is then pruned based on its support (i.e., the number of samples in the training set which validate such rule). The minimum admissible support may also be a parameter which is trained using a cross-validation process.

At stage 210, the CJAMmer model is used, together with the results of an AIP framework from stage 209 providing an incident prediction pair such as <future timestamp, location>, to provide a prediction as to the cause of a particular predicted incident. The AIP framework that is used may be, for example, one that is described in L. Moreira-Matias and F. Alesiani, "Drift3flow: Freeway-incident prediction using real-time learning," 18th International IEEE Conference on Intelligent Transportation Systems (ITSC), October 2015, pp. 566-571, which is incorporated by reference herein. In an exemplary implementation, the trigger for the application of the CJAMmer model to provide a predicted cause in stage 210 is the prediction of a future incident by the AIP framework in stage 209.

At stage 211, a probabilistic incident rate or score is assigned to each location based on the output of stage 210. In an exemplary implementation where the output provided by the AIP framework is probabilistic, this rate or score may be computed by multiplying the probability of congestion provided by the AIP framework by the probability associated with each congestion cause. This may be performed, for example, using a conditional probabilistic procedure based on a frequency-based approach.

In other exemplary implementations where the output provided by the AIP framework is binary, the rate or score may be based on smoothing the probabilities of each cause to provide a fair comparison between the two classes based on their unbalanced relationships—for example, the rate or score may be <support>/4 if the output class was OVERDEMAND and <support> if the output class was REDUCED_CAPACITY (where <support> is the ratio of samples within the training set which support the decision that was taken).

To provide an illustration of the conditional probabilistic procedure, given an incident predicted by an AIP framework at stage 209 with a 70% chance of occurring, and given a prediction by the AICP framework at stage 210 that the incident has a 20% chance of being a reduced capacity incident (and thus an 80% chance of being an overdemand incident), the probability score for the location corresponding to the incident is 0.7*0.2 (i.e., 0.14). It will be appreciated that the score in this example depends on the reduced capacity predictor (0.2) rather than an overdemand predictor (0.8) because reduced capacity events are more likely to be "relevant" (i.e., require attention from a traffic controller).

To provide an illustration where the incident prediction provided by the AIP framework at stage 209 is binary (i.e., the AIP simply indicates whether there is a predicted event or not), the score is based on the value of the reduced capacity predictor. For example, in the case where the AICP framework at stage 210 determines that the incident has a 20% chance of being a reduced capacity incident (and thus an 80% chance of being an overdemand incident), the score may be <support>/4 because the output class is OVERDEMAND, i.e., 0.8/4, which equals 0.2. In another example, where the AICP framework at stage 210 determines that the incident has a 80% chance of being a reduced capacity incident (and thus an 20% chance of being an overdemand incident), the score may be <support> because the output class is REDUCED_CAPACITY, i.e., 0.8. In practice, this causes sensors associated with predictions of reduced capacity to always have priority over sensors associated with overdemand predictions. It will be appreciated that <support> may be used for both OVERDEMAND and REDUCED_CAPACITY output classes (instead of using <support>/4 for the OVERDEMAND output class) in exemplary implementations such as this one having only two output classes, since the normalization provided by using <support>/4 may not needed. However, it will be appreciated that a normalization operation (such as <support>/4) may be particularly useful in situations involving more than two output classes.

At stage 212, the locations are sorted according to the rate or score assigned in stage 211, and data from the sensors corresponding to a particular location are displayed or blocked based on the sorting. For example, each location may have a series of cameras, and footage from the cameras is displayed at a traffic control center for each camera until the number of cameras meets the number of digital displays available at the traffic control center. Data from remaining sensors or locations are not broadcasted to the output devices.

It will be appreciated that ongoing incidents may always be weighted as 0 or 1 and do not involve any prediction. Thus, for example, while an ongoing incident is weighted as a 1, footage from one or more cameras corresponding to the ongoing incident will continually be shown, and the foregoing scores/rates will be used only to allocate the remaining resources (e.g., the remaining displays that are not showing footage from the ongoing incident). To provide an illustrative example, given 1000 cameras providing footage and 20 screens, and given 15 of the 20 screens already being devoted to 15 cameras reporting on-going incidents (corresponding to a score of 1), the remaining 985 cameras have a score assigned to each between 0-1 based on the probability of a relevant incident (i.e., a reduced_capacity incident) to emerge on them. The 5 cameras out of the 985 with the top scores are selected for the remaining 5 screens while the remaining ones have their signals blocked.

In an exemplary embodiment, each time the model is trained at stage 207 or an incident is predicted at stage 209, stages 210 through 212 may be repeated to predict a cause, determine probabilistic incident rates/scores, and select data from data sources to be output.

Figure 6:
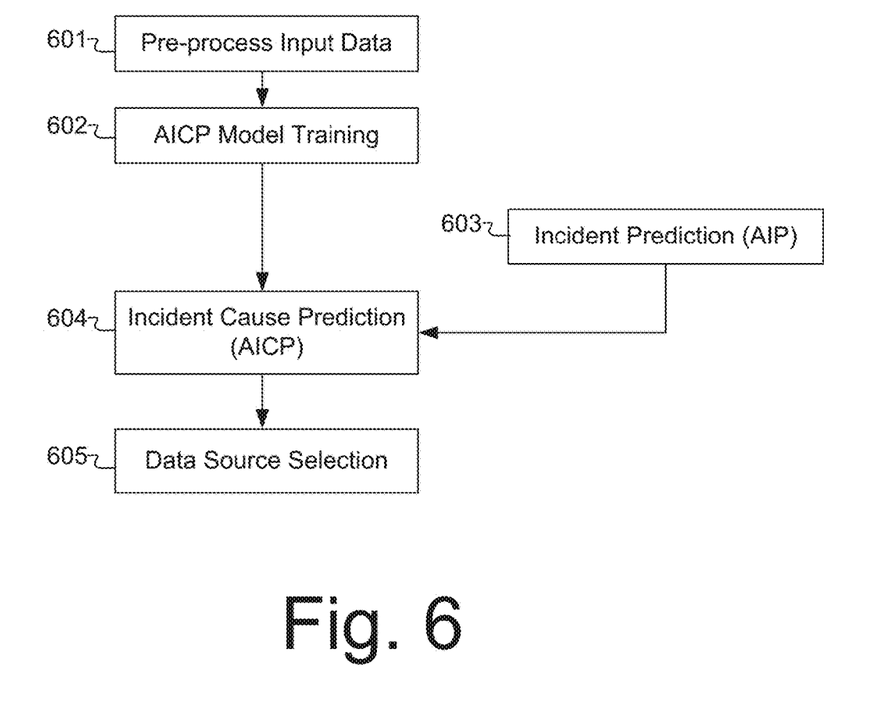
FIG. 6 is a flowchart illustrating an exemplary filtering process in an exemplary embodiment.

FIG. 6 is a flowchart illustrating an exemplary filtering process in an exemplary embodiment, which shows the overall process implemented on the one or more network computing devices 110 depicted in FIG. 1. At stage 601, input datasets from a plurality of traffic-related or weather-related data sources are pre-processed, including a selection of features to be used in an AICP framework. At stage 602, the AICP framework is trained using a machine-learning algorithm. At stage 603, an incident or congestion alarm is provided by an AIP framework. At stage 604, the predicted congestion event corresponding to the alarm provided by the AIP framework is classified based on a predicted cause corresponding to the event. At stage 605, a subset of the input datasets is selected for broadcast at a traffic control center based on the predicted cause (e.g., via a probabilistic score calculated based on the predicted cause).

Exemplary embodiments of the invention thus for a reduction in network resources usage by pushing just a subset of the available data signals into available output devices. Unlike a conventional round-robin schema, the filtering system discussed herein allows for efficient and intelligent management of the available resources (i.e. digital displays), utilizing a proactive approach expressed through a probabilistic score indicating the relevance for a particular data input. The probabilistic score aims to approximate the likelihood that some relevant traffic incident will occur at a given location on a short-term time horizon.

Exemplary embodiments of the invention further provide for using a predicted cause—determined via a machine-learning classification process—for a predicted future congestion event to direct traffic controllers' attention to the locations and corresponding data that are most likely to be relevant. Moreover, the classification process is optimized to deal with problems having highly unbalanced datasets, and utilizes various preprocessing and postprocessing stages in an advantageous manner. These stages include, for example, feature selection via FAMD and RELIEFF techniques, boosting and winnowing components, recurrent model re-training, and a sliding window to consider only the most recent samples, as well as a final rule set linearization and rule pruning stage to avoid overfitting.

All references, including publications, patent applications, and patents, cited herein are hereby incorporated by reference to the same extent as if each reference were individually and specifically indicated to be incorporated by reference and were set forth in its entirety herein.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A system for filtering data for a traffic control center, comprising:
    a plurality of data sources, comprising a plurality of traffic-related data sources and a weather-related data source;
    one or more network computing devices, configured to:
        obtain predictions of incidents, wherein each predicted incident indicates a future time of the predicted incident and a location of the predicted incident;
        determine predicted causes of each of the predicted incidents according to a machine learning model utilizing historical data from the plurality of data sources;
        assign probabilistic incident scores to the locations corresponding to the predicted incidents, wherein the probabilistic incident score for a respective location corresponding to a respective predicted incident is based on the predicted cause of the respective predicted incident;
        rank the locations corresponding to the predicted incidents based on the assigned probabilistic incident scores; and
        select a subset of data from the plurality of data sources for output to the traffic control center based on the ranking; and
    one or more output devices, located at the traffic control center, configured to display the subset of data selected by the one or more network computing devices.

2. The system according to claim 1, wherein the one or more network computing devices are further configured to, before training the machine learning model, perform a feature selection to reduce a number of variables considered when training the machine learning model.

3. The system according to claim 1, wherein the machine learning model is trained using the C4.5 algorithm and enhanced via a boosting technique.

4. The system according to claim 1, wherein the one or more network computing devices are further configured to, after training the machine learning model, to perform post-processing by linearizing a decision tree generated by the training into a rule set.

5. The system according to claim 4, wherein the post-processing further comprises pruning the rule set based on an amount of support for each rule from the historical data.

6. A non-transitory computer-readable medium having processor-executable instructions stored thereon for filtering data for a traffic control center, the processor-executable instructions, when executed by a processor, facilitating performance of the following:
    receiving traffic-related data and weather-related data from a plurality of data sources;
    obtaining predictions of incidents, wherein each predicted incident indicates a future time of the predicted incident and a location of the predicted incident;
    determining predicted causes of each of the predicted incidents according to a machine learning model utilizing historical data from the plurality of data sources;
    assigning probabilistic incident scores to the locations corresponding to the predicted incidents, wherein the probabilistic incident score for a respective location corresponding to a respective predicted incident is based on the predicted cause of the respective predicted incident;
    ranking the locations corresponding to the predicted incidents based on the assigned probabilistic incident scores;
    selecting a subset of data from one or more traffic-related data sources to be output to the traffic control center based on the ranking; and
    outputting the selected subset of data to the traffic control center.

7. The non-transitory computer-readable medium according to claim 6, wherein the processor-executable instructions, when executed, further facilitate:
    before training the machine learning model, performing a feature selection to reduce a number of variables considered when training the machine learning model.

8. A method for filtering data for a traffic control center, the method comprising:
    receiving, by a network computing system, traffic-related data and weather-related data from a plurality of data sources;
    obtaining, by the network computing system, predictions of incidents, wherein each predicted incident indicates a future time of the predicted incident and a location of the predicted incident;
    determining, by the network computing system, predicted causes of each of the predicted incidents according to a machine learning model utilizing historical data from the plurality of data sources;
    assigning, by the network computing system, probabilistic incident scores to the locations corresponding to the predicted incidents, wherein the probabilistic incident score for a respective location corresponding to a respective predicted incident is based on the predicted cause of the respective predicted incident;
    ranking, by the network computing system, the locations corresponding to the predicted incidents based on the assigned probabilistic incident scores;
    selecting, by the network computing system, a subset of data from one or more traffic-related data sources to be output to the traffic control center based on the ranking; and
    outputting, by the network computing system, the selected subset of data to the traffic control center.

9. The method according to claim 8, wherein the method further comprises:
> before training the machine learning model, performing a feature selection to reduce a number of variables considered when training the machine learning model.

10. The system according to claim 1, wherein the probabilistic incident score for a respective location corresponding to a respective predicted incident is further based an incident likelihood corresponding to the respective predicted incident.

\* \* \* \* \*